(12) United States Patent
Gokan

(10) Patent No.: US 9,505,382 B2
(45) Date of Patent: Nov. 29, 2016

(54) CLEANING DEVICE FOR VEHICLE-MOUNTED CAMERA AND METHOD OF CLEANING VEHICLE-MOUNTED CAMERA

(71) Applicant: NISSAN MOTOR CO., LTD., Yokohama-shi, Kanagawa (JP)

(72) Inventor: Toshimichi Gokan, Machida (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/413,613

(22) PCT Filed: Jul. 9, 2013

(86) PCT No.: PCT/JP2013/068715
§ 371 (c)(1),
(2) Date: Jan. 8, 2015

(87) PCT Pub. No.: WO2014/010578
PCT Pub. Date: Jan. 16, 2014

(65) Prior Publication Data
US 2015/0203077 A1   Jul. 23, 2015

(30) Foreign Application Priority Data
Jul. 11, 2012   (JP) ................................. 2012-155354

(51) Int. Cl.
*B60S 1/56*   (2006.01)
*B60S 1/52*   (2006.01)
(Continued)

(52) U.S. Cl.
CPC .. *B60S 1/56* (2013.01); *B05B 7/08* (2013.01); *B60R 11/04* (2013.01); *B60S 1/0848* (2013.01); *B60S 1/52* (2013.01); *G03B 17/02* (2013.01); *G03B 17/08* (2013.01); *H04N 5/2171* (2013.01);
(Continued)

(58) Field of Classification Search
CPC .......... B60S 1/0848; B60S 1/56; B60S 1/52; B60R 11/04; H04N 5/2171; H04N 5/2252; G03B 17/02; G03B 17/08; B05B 7/08
See application file for complete search history.

(56) References Cited

U.S. PATENT DOCUMENTS 5,068,770 A * 11/1991 Baziuk ................ B60Q 1/0005
15/250.01
5,657,929 A *  8/1997 DeWitt et al. ............. 239/284.2
(Continued)

FOREIGN PATENT DOCUMENTS

DE    102010007850 A1    9/2010
DE      2010041475 A1 *  6/2011
(Continued)

*Primary Examiner* — Alexander Markoff
(74) *Attorney, Agent, or Firm* — Young Basile Hanlon & MacFarlane, P.C.

(57) ABSTRACT

A nozzle for cleaning a lens surface of a camera includes a cleaning liquid path that guides a cleaning liquid to a discharge port and an air passage that guides a compressed air to a discharge port. Furthermore, a distal end portion of the cleaning liquid path and a distal end portion of the air passage are disposed so as to be proximate to each other, or are disposed so as to be merged with each other. Then, at the time of cleaning the lens surface, the compressed air is made intermittently jet from the discharge port, and the cleaning liquid is suctioned with the negative pressure occurring due to the jetting of the compressed air to make the cleaning liquid intermittently jet from the discharge port, thereby cleaning the lens surface.

7 Claims, 10 Drawing Sheets

(51) Int. Cl.
    *B60S 1/08*     (2006.01)
    *H04N 5/225*     (2006.01)
    *B05B 7/08*     (2006.01)
    *B60R 11/04*     (2006.01)
    *G03B 17/02*     (2006.01)
    *G03B 17/08*     (2006.01)
    *H04N 5/217*     (2011.01)

(52) U.S. Cl.
    CPC .......... *H04N 5/2251* (2013.01); *H04N 5/2252* (2013.01)

(56) References Cited

U.S. PATENT DOCUMENTS

| | | | |
|---|---|---|---|
| 5,853,025 A * | 12/1998 | Daneshvar | B60S 1/481 137/565.34 |
| 6,237,627 B1 * | 5/2001 | Boule | B60S 1/481 137/571 |
| 6,554,210 B2 * | 4/2003 | Holt et al. | 239/284.2 |
| 6,944,908 B2 * | 9/2005 | Hoetzer et al. | 15/316.1 |
| 9,278,670 B2 | 3/2016 | Hattori et al. | |
| 2001/0054655 A1 * | 12/2001 | Berg | B60S 1/481 239/284.1 |
| 2002/0005440 A1 * | 1/2002 | Holt et al. | 239/284.2 |
| 2003/0155001 A1 * | 8/2003 | Hoetzer et al. | 134/37 |
| 2009/0250533 A1 * | 10/2009 | Akiyama et al. | 239/284.1 |
| 2011/0073142 A1 | 3/2011 | Hattori et al. | |
| 2012/0117745 A1 | 5/2012 | Hattori et al. | |
| 2015/0151722 A1 * | 6/2015 | Gokan et al. | B60S 1/56 |
| 2015/0177512 A1 * | 6/2015 | Hayakawa et al. | G02B 27/0006 |

FOREIGN PATENT DOCUMENTS

| | | |
|---|---|---|
| DE | 2011017684 A1 * | 11/2011 |
| DE | 2012218583 A1 * | 4/2013 |
| JP | 2001-171491 A | 6/2001 |
| JP | 2004182080 A | 7/2004 |
| JP | 2006160103 A * | 6/2006 |
| JP | 2007053448 A * | 3/2007 |
| JP | 2009-081765 A | 4/2009 |
| JP | 2010155484 A * | 7/2010 |
| JP | 2011240920 A | 12/2011 |
| WO | WO 2005039934 A2 * | 5/2005 |
| WO | WO 2012138455 A1 * | 10/2012 |

* cited by examiner

FIG. 2
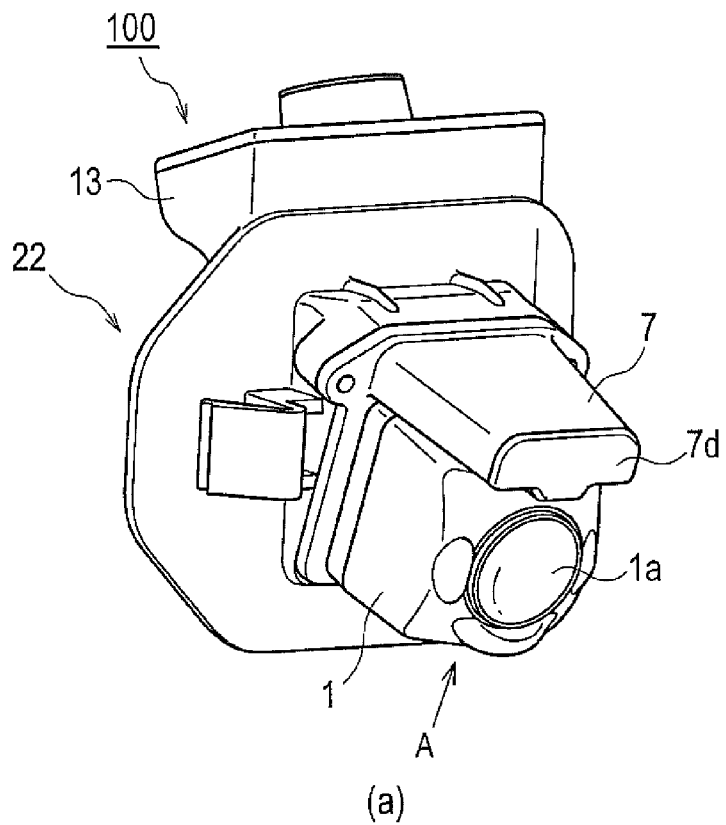
(a)
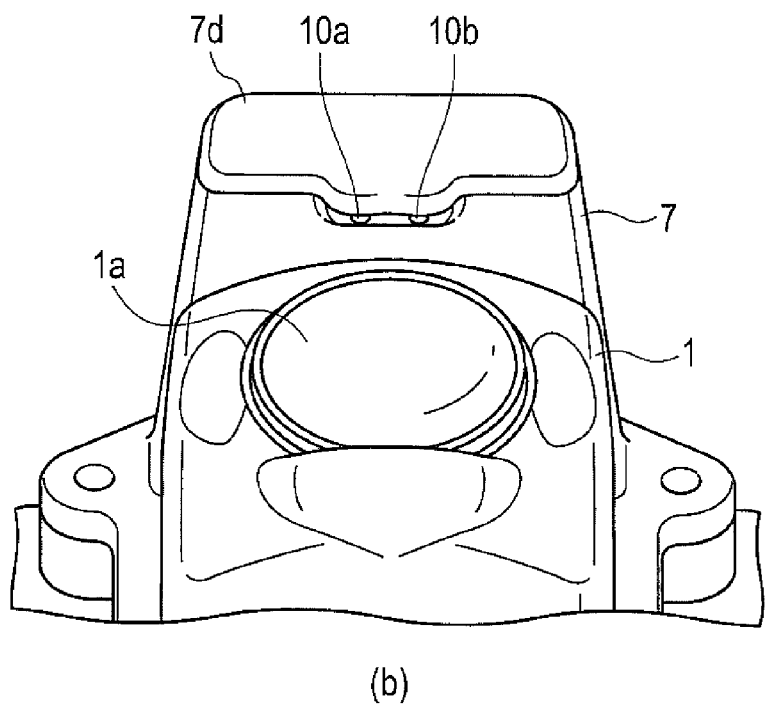
(b)

FIG. 6
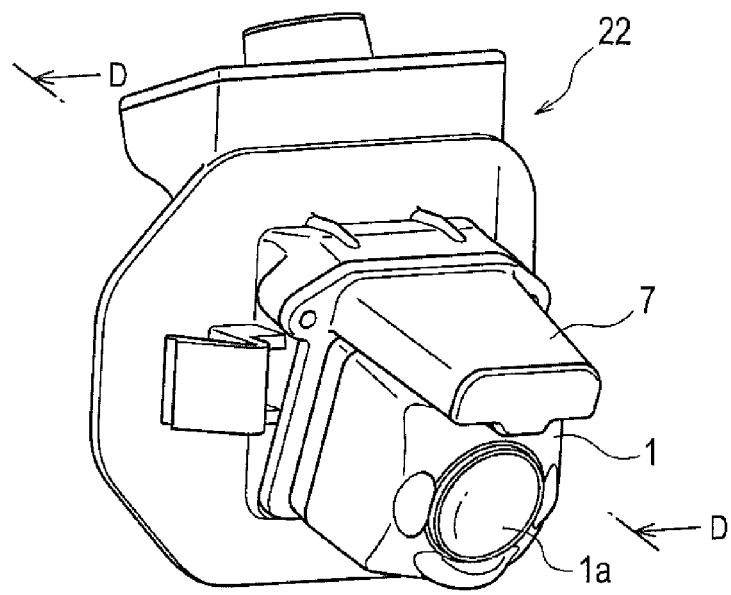
(a)
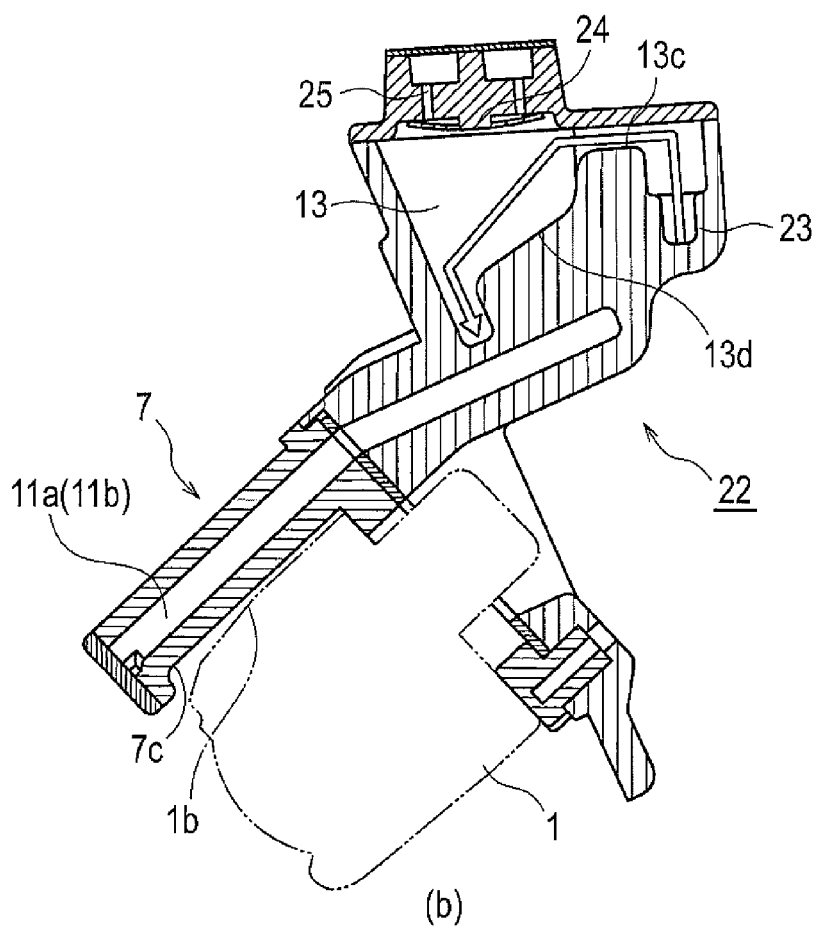
(b)

CLEANING DEVICE FOR VEHICLE-MOUNTED CAMERA AND METHOD OF CLEANING VEHICLE-MOUNTED CAMERA

CROSS REFERENCE TO RELATED APPLICATION

The present application claims priority to Japanese Patent Application No. 2012-155354, filed Jul. 11, 2012, incorporated herein in its entirety.

TECHNICAL FIELD

The present invention relates to a cleaning device for cleaning a vehicle-mounted camera mounted, for example, at the rear portion of a vehicle to capture images of the rear of the vehicle, and a method of cleaning the vehicle-mounted camera.

BACKGROUND

For a vehicle-mounted camera, which is, for example, mounted at the rear of a vehicle and captures surrounding images to monitor a vehicle traveling behind the vehicle or obstructions existing in the surroundings of the vehicle, foreign substances such as water droplets and mud may be attached on a lens serving as an image-capturing surface, for example, during rainy weather. In such a case, the vehicle-mounted camera cannot clearly capture the surrounding image. In this respect, there is a known device for cleaning a lens of the vehicle-mounted camera described, for example, in Japanese Patent Laid-Open Publication No. 2001-171491. With the cleaning device disclosed in Patent Literature 1, a cleaning liquid is sprayed over the lens surface of the camera, and then, high-pressurized air is sprayed to remove the foreign substances attached on the lens.

However, the conventional example disclosed in Japanese Patent Laid-Open Publication No. 2001-171491 described above needs a large amount of cleaning liquid to be sprayed over the lens surface, causing a problem of consuming the large amount of cleaning liquid.

SUMMARY

The present invention has been made to solve the problem of the conventional technique as described above, and an object of the present invention is to provide a cleaning device for a vehicle-mounted camera, which can reliably clean the lens surface with a small amount of cleaning liquid.

In order to achieve the object described above, the cleaning device for a vehicle-mounted camera according to the present application includes: a nozzle having a discharge port from which a cleaning liquid and a compressed air discharge and which are disposed so as to face a lens surface of the camera, having a cleaning liquid path that guides the cleaning liquid to the discharge port and an air passage that guides the compressed air to the discharge port; a cleaning-liquid delivery section that delivers the cleaning liquid through a cleaning liquid pipe to the nozzle; and a compressed-air delivery section that delivers the compressed air through an air pipe to the nozzle, in which the lens surface is cleaned by driving the cleaning-liquid delivery section and intermittently driving the compressed-air delivery section for plural times to make the cleaning liquid and the compressed air jet from the discharge port.

Furthermore, the cleaning device for a vehicle-mounted camera according to the present application includes a nozzle having a discharge port from which a cleaning liquid and a compressed air discharge and which are disposed so as to face a lens surface of a camera mounted on a vehicle, in which a distal end portion of a cleaning liquid path that guides the cleaning liquid to the discharge port and a distal end portion of an air passage that guides the compressed air to the discharge port are disposed so as to be proximate to each other, or are disposed so as to be merged with each other, and the cleaning device does cleaning with a continuous water supply mode in which the cleaning liquid is delivered, and the compressed air is intermittently delivered for plural times to make the cleaning liquid and the compressed air jet from the discharge port.

BRIEF DESCRIPTION OF DRAWINGS

FIGS. 2(a) and 2(b) are perspective views each illustrating a configuration of the cleaning device for a vehicle-mounted camera according to the embodiment of the present invention, in which FIG. 2(a) is a perspective view illustrating the cleaning device according to this embodiment in a state that the device is installed to a camera mounted at the rear portion of a vehicle, and FIG. 2(b) is a diagram illustrating the cleaning device illustrated in FIG. 2(a) when viewed from a direction "A."

FIGS. 4(a) and 4(b) are sectional views each illustrating a distal end portion of a nozzle of the cleaning device for a vehicle-mounted camera according to the embodiment of the present invention, in which FIG. 4(a) is an exploded view illustrating the distal end portion of the nozzle, and FIG. 4(b) is a sectional view illustrating a portion of a reference sign P1 in FIG. 4(a).

FIGS. 6(a) and 6(b) are diagrams each illustrating a configuration of the cleaning device for a vehicle-mounted camera according to the embodiment of the present invention, in which FIG. 6(a) is a perspective view illustrating the cleaning device according to this embodiment in a state where the device is installed to a camera mounted at the rear portion of a vehicle, and FIG. 6(b) is a sectional view illustrating a nozzle unit taken along a line D-D illustrated in FIG. 6(a).

FIGS. 9(a) and 9(b) are timing charts each showing processes in a pressurized cleaning mode performed by the cleaning device for a vehicle-mounted camera according to the embodiment of the present invention, in which FIG. 9(a) is a timing chart showing an operation of a cleaning liquid pump, and FIG. 9(b) is a timing chart showing an operation of an air pump.

FIGS. 10(a) and 10(b) are timing charts each showing processes in an air blow mode performed by the cleaning device for a vehicle-mounted camera according to the embodiment of the present invention, in which FIG. 10(a) is a timing chart showing an operation of the cleaning liquid pump, and FIG. 10(b) is a timing chart showing an operation of the air pump.

FIGS. 11(a) and 11(b) are timing charts each showing processes in a continuous water supply mode performed by the cleaning device for a vehicle-mounted camera according to the embodiment of the present invention, in which FIG. 11(a) is a timing chart showing an operation of the cleaning liquid pump, and FIG. 11(b) is a timing chart showing an operation of the air pump.

DESCRIPTION OF EMBODIMENTS

Figure 1:
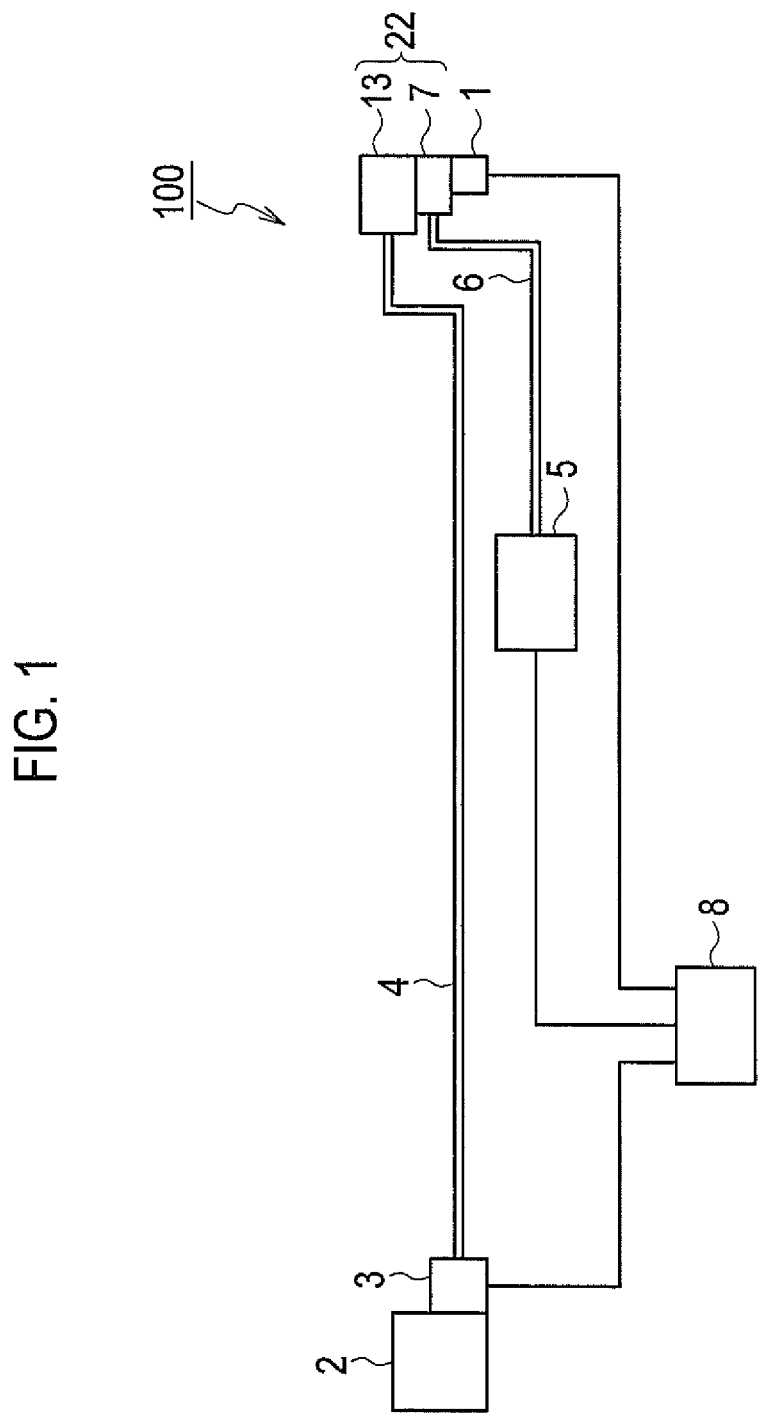
FIG. 1 is a block diagram illustrating a configuration of a cleaning device for a vehicle-mounted camera according to an embodiment of the present invention.

Herein below, an embodiment according to the present invention will be described with reference to the drawings. FIG. 1 is a block diagram illustrating a configuration of a cleaning device for a vehicle-mounted camera according to an embodiment of the present invention. As illustrated in FIG. 1, a cleaning device 100 according to this embodiment includes a cleaning liquid reservoir tank 2 (primary tank) that stores a cleaning liquid, a cleaning liquid pump 3 (cleaning-liquid delivery section) that delivers the cleaning liquid stored in the cleaning liquid reservoir tank 2, an air pump 5 (compressed-air delivery section) that delivers a compressed air, and a nozzle 7 for discharging the cleaning liquid, the compressed air, or a mixture of the cleaning liquid and the compressed air to a lens surface of a camera 1.

Furthermore, there are provided a cleaning liquid pipe 4 that guides the cleaning liquid delivered by the cleaning liquid pump 3 to a secondary tank 13 that stores the cleaning liquid, an air pipe 6 that guides the compressed air delivered by the air pump 5 to the nozzle 7 of a nozzle unit 22, and a controller 8 (control section) that controls operations of the cleaning liquid pump 3 and the air pump 5.

FIG. 2(a) is a perspective view illustrating the cleaning device 100 according to this embodiment in a state where the device is installed to a camera 1 mounted at the rear portion of a vehicle, and FIG. 2(b) is a diagram illustrating the cleaning device 100 illustrated in FIG. 2(a) when viewed from the direction "A." As illustrated in FIG. 2(a), the nozzle unit 22 that is fixed at the rear portion of the vehicle and cleans a lens surface 1a is provided in the vicinity of a side portion of the camera 1 fixed at the rear portion of the vehicle. The nozzle unit 22 includes the nozzle 7 from which a cleaning liquid and compressed air discharge toward the lens surface 1a, and a cap 7d. As illustrated in FIG. 2(b), the nozzle 7 has a distal end portion provided with two discharge ports 10a and 10b from which the cleaning liquid and the compressed air discharge. In other words, configuration is made such that, by discharging the cleaning liquid and the compressed air from the discharge ports 10a and 10b of the nozzle 7 toward the lens surface 1a, foreign substances attached on the lens surface 1a are removed.

Figure 3:
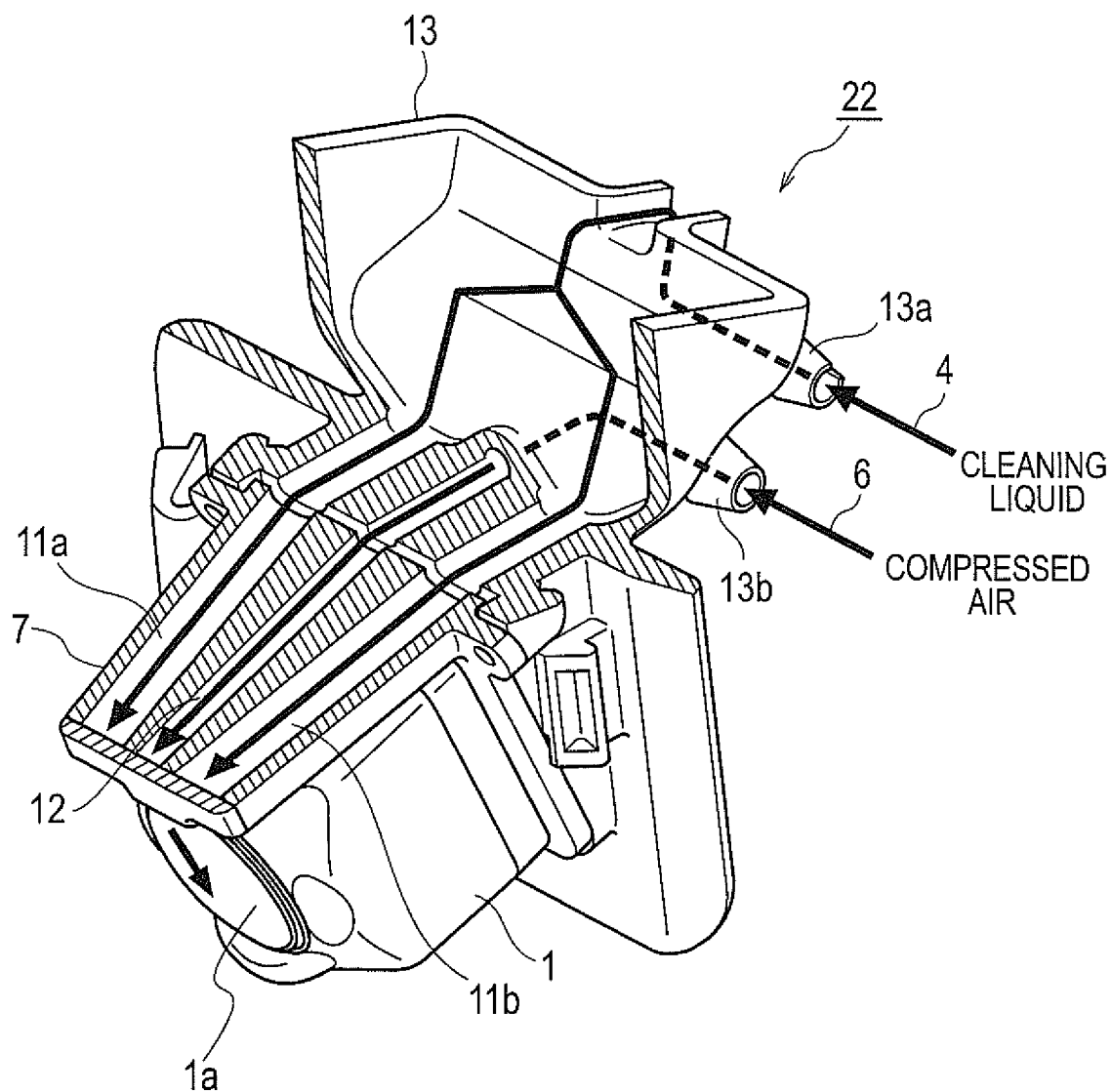
FIG. 3 is a partially-sectioned perspective view illustrating a nozzle unit provided to the cleaning device for a vehicle-mounted camera according to the embodiment of the present invention.

FIG. 3 is a partially-sectioned perspective view illustrating the nozzle unit 22 illustrated in FIG. 2(a). As illustrated in FIG. 3, the nozzle 7, provided on the distal end side of the nozzle unit 22, has the central portion provided with an air passage 12 that guides the compressed air, and at both ends in the left and right sides of this air passage 12, cleaning liquid paths 11a and 11b that guide the cleaning liquid are provided. Furthermore, the distal end of each of the air passage 12 and the cleaning liquid paths 11a and 11b is bent at a substantially right angle so as to face the lens surface 1a of the camera 1.

Furthermore, a secondary tank 13 that temporarily stores the cleaning liquid is provided upstream of the cleaning liquid paths 11a and 11b. On the side portion of this secondary tank 13, a plug 13a for connecting the cleaning liquid pipe 4 and a plug 13b for connecting the air pipe 6 are provided. Of these plugs, the plug 13b is connected with the air passage 12 through a flow path provided below the secondary tank 13. In other words, the compressed air guided through the plug 13b into the nozzle unit 22 is led directly into the air passage 12.

Furthermore, the plug 13a is connected with the secondary tank 13, and the cleaning liquid supplied through this plug 13a is led into the secondary tank 13 from above. In this case, the pipe extending from the plug 13a and connected with the secondary tank 13 is disposed in the vertical direction as indicated by the reference sign 23 in FIG. 6(b). Details of this pipe 23 will be described later.

In addition, as illustrated in FIG. 3, the bottom portion of the secondary tank 13 is connected with two lines of the cleaning liquid paths 11a and 11b, and is disposed at a position higher than the discharge ports 10a and 10b. Thus, the compressed air delivered by the air pump 5 illustrated in FIG. 1 is led into the air passage 12 of the nozzle 7 through the air pipe 6, whereas the cleaning liquid delivered by the cleaning liquid pump 3 is stored in the secondary tank 13, and then, is led into the two lines of the cleaning liquid paths 11a and 11b. Furthermore, the secondary tank 13 has the volume smaller than the cleaning liquid reservoir tank 2 illustrated in FIG. 1.

Figure 4A:
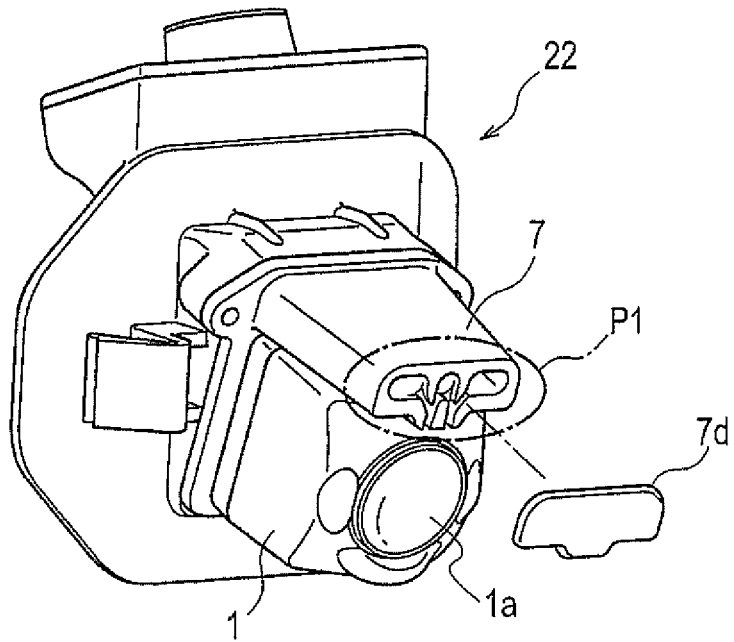
Figure 4B:
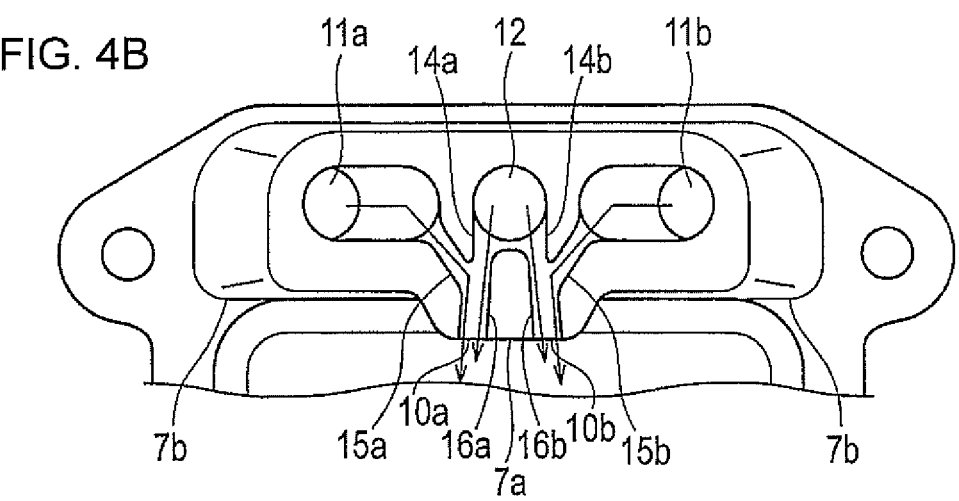

FIG. 4(b) is an explanatory view illustrating a detailed configuration of the distal end portion of the nozzle, and is a sectional view illustrating a portion of the reference sign P1 in FIG. 4(a). As illustrated in FIG. 4(b), at the distal end portion of the nozzle 7, the air passage 12 is provided at the center, and the two cleaning liquid paths 11a and 11b are provided so as to be located at both sides of the air passage 12. In other words, the cleaning liquid paths according to this embodiment are formed by two lines of the cleaning liquid paths 11a and 11b provided so as to be located at both sides of this air passage 12.

The cleaning liquid paths 11a and 11b are connected to distal end portions 15a and 15b, respectively. In this case, the area of a flow path of each of the distal end portions 15a and 15b is smaller than the area of a flow path of each of the cleaning liquid paths 11a and 11b. Thus, the speed of the cleaning liquid flowing through each of the cleaning liquid paths 11a and 11b increases when it flows through each of the distal end portions 15a and 15b.

On the other hand, the distal end of the air passage 12 is bifurcated into two distal end portions 14a (first distal end portion) and 14b (second distal end portion). In this case, the area of a flow path of each of the distal end portions 14a and 14b is smaller than the area of a flow path of the air passage 12. Thus, the speed of the compressed air flowing through the air passage 12 increases when it flows through each of the distal end portions 14a and 14b.

Furthermore, the distal end portion 15a of the cleaning liquid path 11a, which is one side, merges with one distal end portion 14a of the air passage 12 to form a merging flow path 16a (first merging flow path), the distal end of which forms the discharge port 10a (see FIG. 2(b)). Furthermore, the distal end portion 15b of the cleaning liquid path 11b, which is the other side, merges with the other distal end portion 14b of the air passage 12 to form a merging flow path 16b (second merging flow path), the distal end of which forms the discharge port 10b (see FIG. 2(b)). In this case, the merging flow path 16a and the merging flow path 16b are disposed in a manner such that the distance between the two paths increases toward the distal end side thereof.

Figure 5:
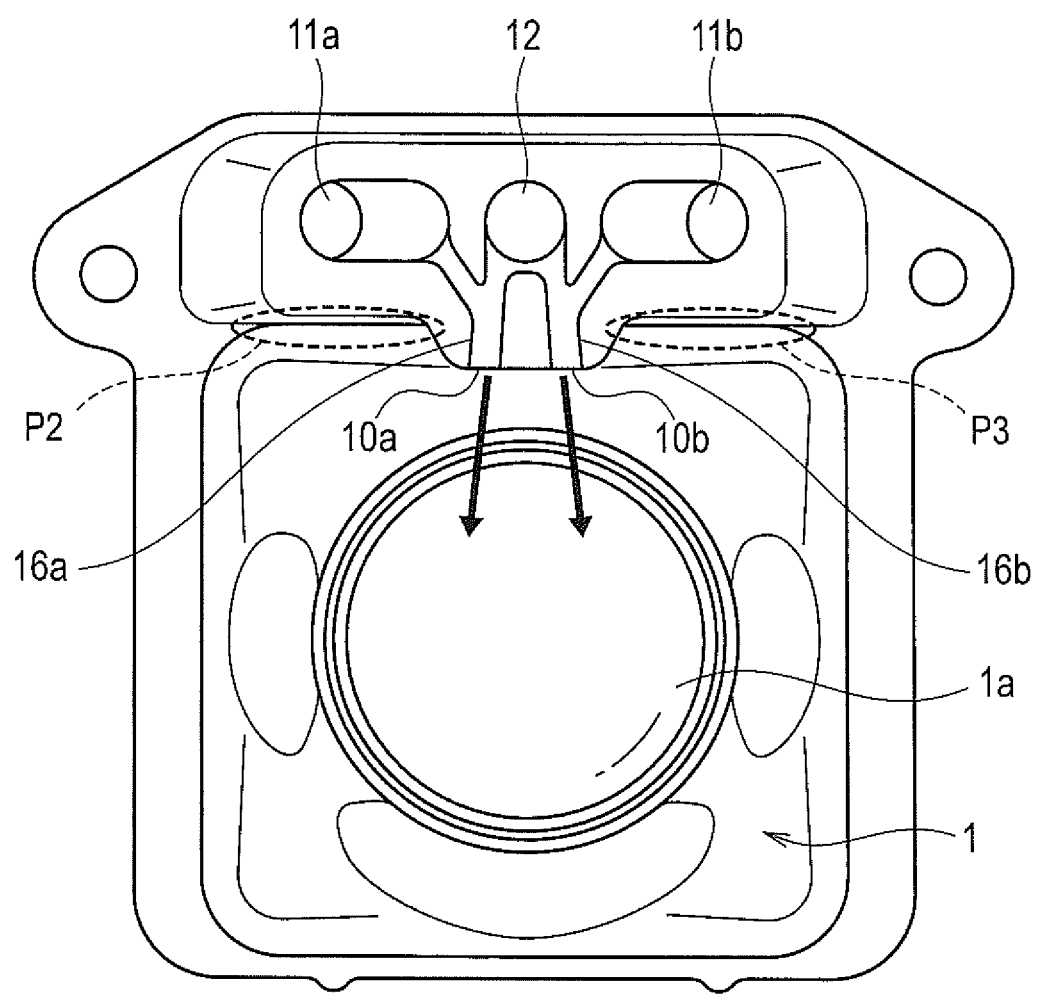
FIG. 5 is an explanatory view illustrating an arrangement relationship between the camera and the distal end portion of the nozzle provided to the cleaning device for a vehicle-mounted camera according to the embodiment of the present invention.

With this configuration, once the cleaning liquid delivered by the cleaning liquid pump 3 illustrated in FIG. 1 is stored in the secondary tank 13, and the compressed air is delivered by the air pump 5, the compressed air jets at an increased speed, and with the jet of the compressed air, the secondary tank 13 and the cleaning liquid paths 11a and 11b are made into a negative pressure to suction the cleaning liquid stored in the secondary tank 13. Thus, the compressed air and the cleaning liquid pass through the two merging flow paths 16a and 16b, jet from the discharge ports 10a and 10b, and are sprayed onto the lens surface 1a. At this time, the liquid, which is a mixture of the cleaning liquid and the compressed air, jets in a direction spreading out as illustrated in FIG. 5, whereby it is possible to clean the entire lens surface 1a.

Furthermore, as illustrated in FIG. 4(b), a jetting surface 7a, which is a distal end portion of the nozzle 7, is configured to protrude more forward than a side surface 7b (nozzle distal-end surface) in the vicinity of the jetting surface 7a. This configuration makes it possible to prevent the cleaning liquid jetting from the discharge ports 10a and 10b from being attached on the side surface 7b of the nozzle 7. More specifically, it is possible to prevent the cleaning liquid from being attached on areas indicated by the reference signs P2 and P3 in FIG. 5.

FIG. 6(b) is a sectional view illustrating the nozzle unit 22 illustrated in FIG. 6(a) and taken along the line D-D. As illustrated in FIG. 6(b), a small space is provided between a bottom surface 7c of the nozzle 7 and an upper surface 1b of the body of the camera 1. Furthermore, the width of this space is configured so as to be gradually narrower toward the inside of the space. With such a configuration, even if the cleaning liquid enters the space between the bottom surface 7c of the nozzle 7 and the upper surface 1b of the body of the camera 1, this cleaning liquid is gradually pushed toward the inside of the space portion between the nozzle 7 and the camera 1 due to the surface tension, and is released externally from the left and right sides of the camera 1 when viewed from the front. In other words, with the existence of the small space between the bottom surface 7c of the nozzle 7 and the upper surface 1b of the body of the camera 1, it is possible to avoid a problem such as a cleaning liquid staying to be solidified.

Furthermore, as illustrated in FIG. 6(b), a supply port 13c for supplying the cleaning liquid into the secondary tank 13 is provided on the upper part of the secondary tank 13 provided upstream of the nozzle 7, and to this supply port 13c, the pipe 23 placed in the vertical direction is provided. Then, this pipe 23 is connected with the plug 13a illustrated in FIG. 3. With the pipe 23 being placed in the vertical direction, it is possible to prevent the cleaning liquid staying in the pathway from irregularly entering the secondary tank 13 in the case where supply of the cleaning liquid by the cleaning liquid pump 3 (see FIG. 1) is stopped. In other words, it is possible to prevent the cleaning liquid from entering the secondary tank 13 due to vibration in a state where the secondary tank 13 is empty.

Furthermore, a check valve 24 is provided on the upper surface of the secondary tank 13. The check valve 24 is, for example, an umbrella valve, and is configured such that, if the pressure within the secondary tank 13 becomes negative pressure, the valve is opened to introduce the outside air through an air vent 25, and if the pressure within the secondary tank 13 becomes positive pressure, the valve is closed to prevent release to the outside. Thus, if the secondary tank 13 becomes negative pressure, the outside air enters the secondary tank 13, whereby it is possible to prevent the cleaning liquid from entering through the cleaning liquid pipe 4. In other words, the secondary tank 13 has the check valve that prevents air from leaking from the secondary tank 13 to the outside, and allows air to enter the secondary tank 13 from the outside.

Furthermore, as illustrated in FIG. 6(b), the bottom surface 13d of the secondary tank 13 is sloped so as to descend toward the front side (left side in the drawing). In addition, an outlet pipe of the secondary tank 13 as well as the cleaning liquid paths 11a and 11b and the air passage 12 (see FIG. 3) provided to the nozzle 7 are similarly configured to be sloped so as to descend toward the front side. With these configurations, the cleaning liquid stored in the secondary tank 13 does not stay in a certain location, and the slope on each of the portions causes the cleaning liquid to reliably flow toward the downstream side.

Figure 7:
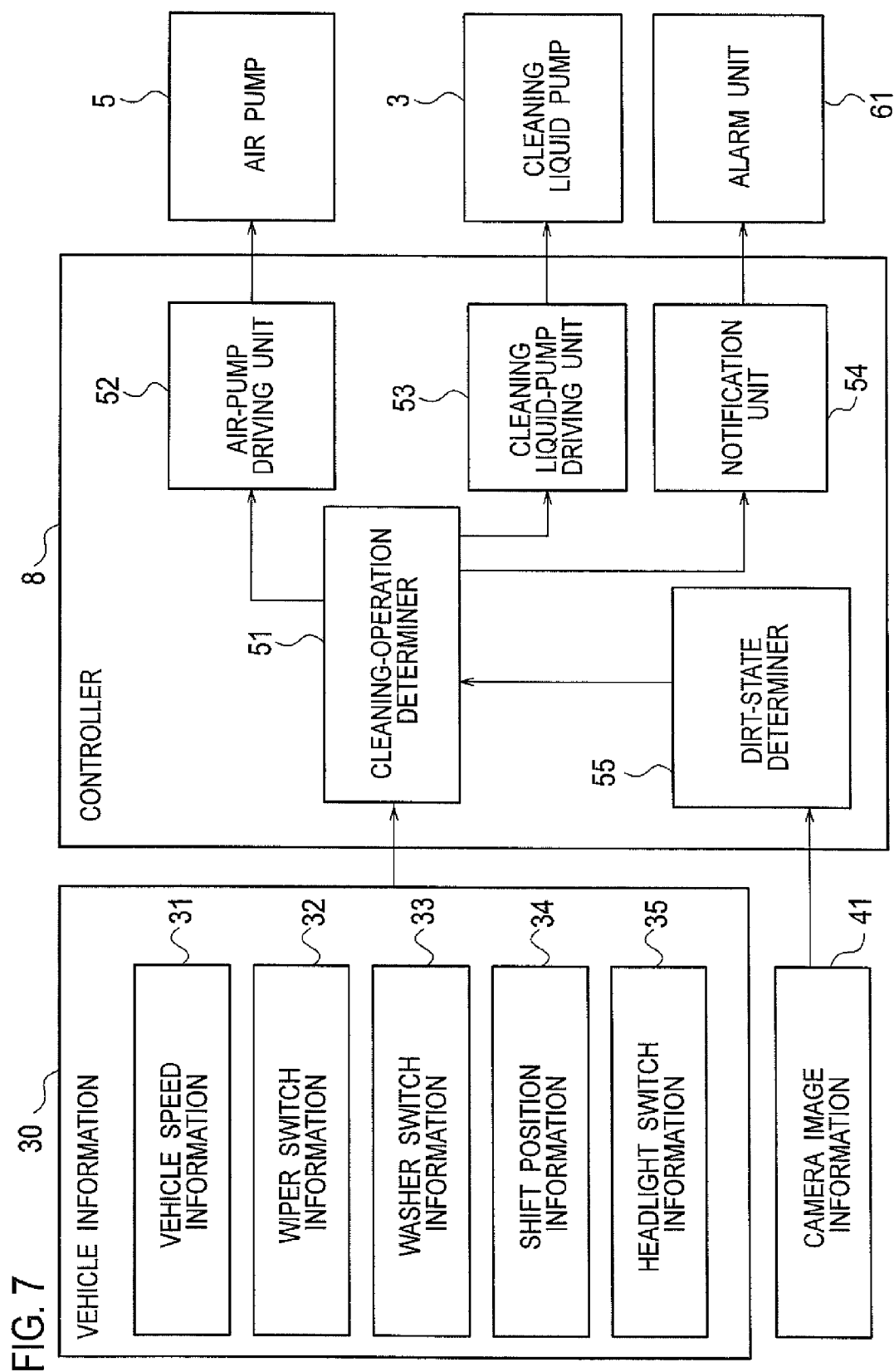
FIG. 7 is a block diagram illustrating a detailed configuration of a controller of the cleaning device for a vehicle-mounted camera according to the embodiment of the present invention.

Next, detailed configurations of a controller 8 (control section) illustrated in FIG. 1 will be described with reference to the block diagram illustrated in FIG. 7. As illustrated in FIG. 7, the controller 8 is connected with a control unit provided to a vehicle, acquires various pieces of information on the vehicle including vehicle speed information 31, wiper switch information 32, washer switch information 33, shift position information 34, and headlight switch information 35, and further acquires camera image information 41, which is an image captured by the camera 1.

Furthermore, the controller 8 includes a dirt-state determiner 55 (dirt-state determining section) that determines, based on the camera image information 41, whether the lens surface 1a of the camera 1 gets dirty, and a cleaning-operation determiner 51 that determines a cleaning mode (which will be specifically described later) for the lens surface 1a based on various pieces of information on the vehicle. In addition, the controller 8 includes an air-pump driving unit 52 that controls operation of the air pump 5 based on the cleaning mode determined by the cleaning-operation determiner 51, a cleaning liquid-pump driving unit 53 that controls operation of the cleaning liquid pump 3, and a notification unit 54 that outputs a notification signal when abnormal occurs in a cleaning operation. Moreover, the controller 8 is connected with an alarm unit 61 that notifies occurrence of alarm when the notification unit 54 outputs the notification signal.

Next, a description will be made of types of cleaning modes appropriately set according to determination results made by the cleaning-operation determiner 51. In this embodiment, there are three modes including a pressurized cleaning mode in which the cleaning liquid and the compressed air are caused to jet to clean the lens surface 1a, an air blow mode in which only the compressed air is delivered to remove water droplets attached on the lens surface 1a, and a continuous water supply mode in which the cleaning liquid is intermittently dropped on the lens surface 1a to make it difficult for dirt to be attached on the lens surface 1a. Any one of these three modes is selected appropriately according to various conditions such as dirt states of the lens surface 1a and weather conditions, and is performed to effectively clean the camera 1.

Figure 9:
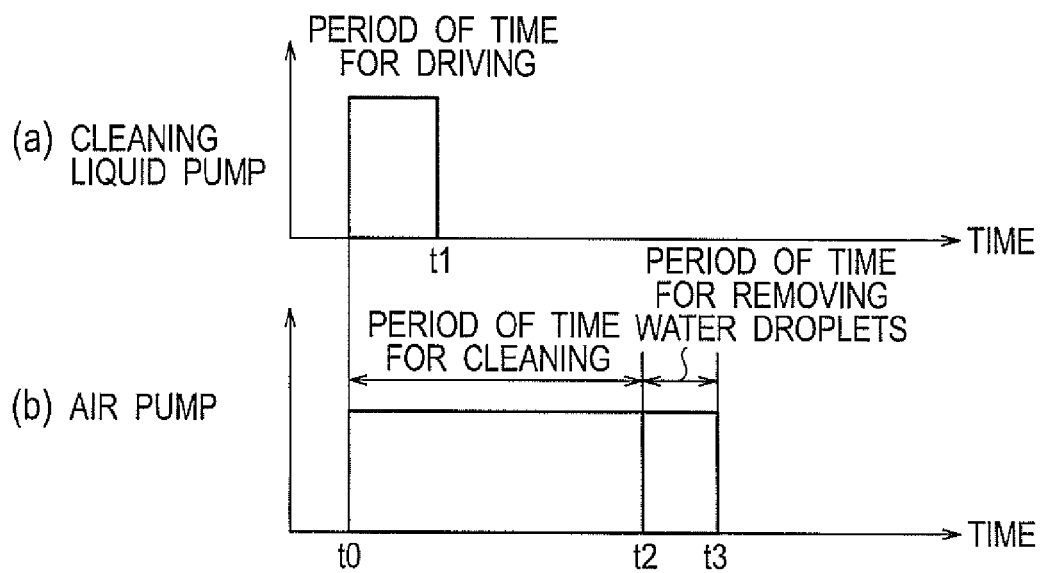

First, the pressurized cleaning mode will be described. In the pressurized cleaning mode, with control made by the cleaning liquid-pump driving unit 53 illustrated in FIG. 7, the cleaning liquid pump 3 is driven for a short period of time to store the cleaning liquid in the secondary tank 13, and at the same time, with control made by the air-pump driving unit 52, the air pump 5 is driven. More specifically, as illustrated in FIG. 9(a) and FIG. 9(b), both of the cleaning liquid pump 3 and the air pump 5 are driven at a time t0.

Then, during a period of time from t0 to t1 (for example, 200 msec), the cleaning liquid stored in the cleaning liquid reservoir tank 2 (primary tank) is supplied through the cleaning liquid pipe 4 to the secondary tank 13, and the cleaning liquid is stored in this secondary tank 13. Note that the period of time from t0 to t1 is set to be a period of time required for fully filling the secondary tank 13 with the cleaning liquid by the cleaning liquid pump 3.

Furthermore, the compressed air delivered by the air pump 5 passes through the air pipe 6, and is introduced into the air passage 12 within the nozzle 7 illustrated in FIG. 3. Then, the compressed air is delivered from the distal end portions 14a and 14b illustrated in FIG. 4(b) to the merging flow paths 16a and 16b. At this time, since the area of the flow path of each of the distal end portions 14a and 14b is set to be smaller than that of the air passage 12, the speed of the air flow increases in each of the distal end portions 14a and 14b. This makes the distal end portions 15a and 15b of the cleaning liquid paths 11a and 11b located upstream of the merging flow paths 16a and 16b, to be negative pressure to suction the cleaning liquid stored in the secondary tank 13, and the cleaning liquid suctioned passes through the cleaning liquid paths 11a and 11b, and enters the merging flow paths 16a and 16b. In other words, by using the reduction in pressure in the secondary tank 13 due to the air flow of the compressed air, the cleaning liquid from the secondary tank 13 is suctioned to pass through the cleaning liquid paths 11a and 11b, and the cleaning liquid is made enter the merging flow paths 16a and 16b.

As a result, in conjunction with the compressed air, the cleaning liquid jets from the merging flow paths 16a and 16b in a form of a mist. Thus, the cleaning liquid in the form of a mist can be caused to jet from the discharge ports 10a and 10b serving as the distal ends of the merging flow paths 16a and 16b, and be sprayed over the lens surface 1a. This makes it possible to remove the foreign substance attached on the lens surface 1a with the synergistic effect of the cleaning liquid in the form of a mist and the air pressure.

Furthermore, after the cleaning liquid within the secondary tank 13 is jetted, and all the cleaning liquid is consumed at a time t2 shown in FIG. 9(b), only the compressed air is jetted during a period of time from t2 to t3, whereby water droplets attached on the lens surface 1a can be removed with this compressed air.

In other words, the pressurized cleaning mode is a mode in which the air pump 5 (compressed-air delivery section) is driven; the compressed air is caused to jet from the discharge ports 10a and 10b; the cleaning liquid supplied to the cleaning liquid paths 11a and 11b is suctioned with the negative pressure occurring as a result of the jet of the compressed air to jet the cleaning liquid from the discharge ports 10a and 10b; and the lens surface 1a is cleaned with the compressed air and cleaning liquid jetted. By driving the cleaning liquid pump 3 (cleaning-liquid delivery section) and continuously delivering the compressed air by the air pump 5 (compressed-air delivery section), the cleaning liquid and the compressed air are caused to continuously jet from the discharge ports 10a and 10b. With the jet of the compressed air, the cleaning liquid path is made into the negative pressure to make the cleaning liquid into the form of a mist and cause it to jet, whereby the lens surface can be effectively cleaned with the small amount of cleaning liquid. This pressurized cleaning mode is suitable for applications that remove foreign substances such as mud attached on the lens surface 1a.

Furthermore, by increasing the period of time for driving the cleaning liquid pump 3 shown in FIG. 9(a) (for example, setting the period of time from t0 to t1 to 400 msec), it is possible to push the cleaning liquid stored in the secondary tank 13 by the pressure of the cleaning liquid pump 3, and the cleaning liquid pressurized can be supplied to the cleaning liquid paths 11a and 11b, whereby it is possible to clean the lens surface 1a with a high pressure.

Figure 10:
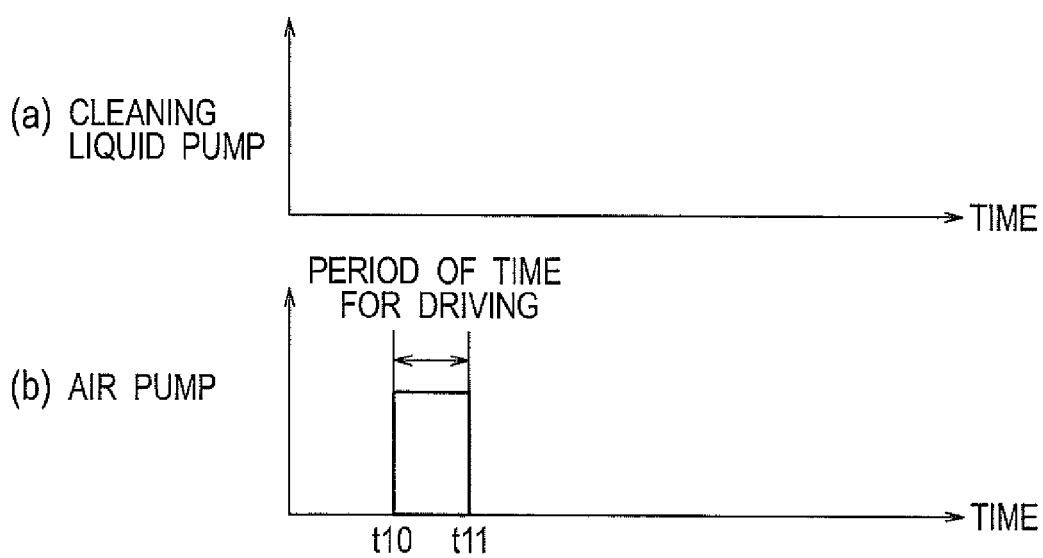

Next, the air blow mode will be described. In the air blow mode, the air-pump driving unit 52 illustrated in FIG. 7 is controlled in a state where the cleaning liquid is not stored in the secondary tank 13, and only the air pump 5 is driven. More specifically, the cleaning liquid pump 3 is stopped as illustrated in FIG. 10(a), and the air pump 5 is driven for a period of time from t10 to t11 (for example, two seconds) as illustrated in FIG. 10(b). Then, the compressed air passes through the distal end portions 14a and 14b of the air passage 12 and the merging flow paths 16a and 16b to jet from the discharge ports 10a and 10b, and is sprayed over the lens surface 1a. As a result, the water droplets attached on the lens surface 1a of the camera 1 can be removed by the air pressure.

At this time, the pipe 23 connected with the secondary tank 13 is placed in a substantially vertical direction as illustrated in FIG. 6(b). Furthermore, the bottom surface 13d of the secondary tank 13 is placed at a position higher than the discharge ports 10a and 10b, and the bottom surface 13d of the secondary tank 13 and the pipe for the cleaning liquid are sloped downward, whereby the cleaning liquid does not remain in the secondary tank 13 and its pipe. Thus, even in the case where the compressed air jets, and the inside of the secondary tank 13 becomes negative pressure, it is possible to prevent the cleaning liquid from being introduced into the merging flow paths 16a and 16b, and it is possible to prevent the cleaning liquid from mixing with the compressed air. This makes it possible to avoid occurrence of a problem in that the cleaning liquid mixed with the compressed air is attached on the lens surface 1a again at the time of jetting the compressed air to remove the water droplet attached on the lens surface 1a. In other words, the air blow mode is a mode in which the delivery of the cleaning liquid by the cleaning liquid pump 3 (cleaning-liquid delivery section) is stopped; the compressed air is delivered to the air pipe 6 by the air pump 5 (compressed-air delivery section) in a state where supply of the cleaning liquid is stopped; and the compressed air is caused to jet from the discharge ports 10a and 10b, whereby the lens surface 1a is cleaned. The air blow mode is suitable to remove the water droplets attached on the lens surface 1a.

Figure 11:
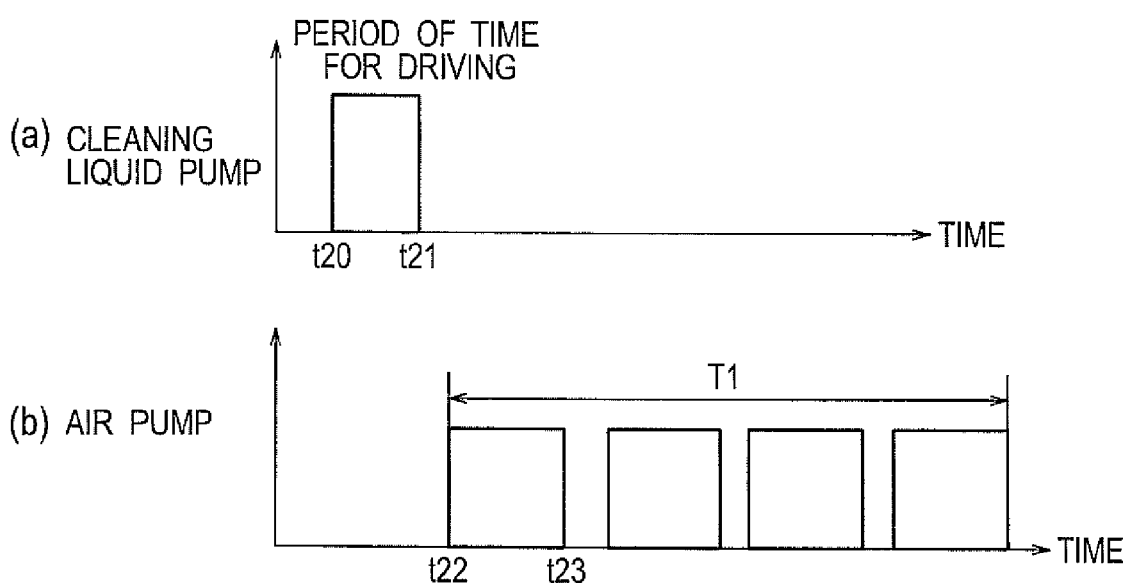

Next, the continuous water supply mode will be described. In the continuous water supply mode, the cleaning liquid is supplied from the cleaning liquid pump 3 into the secondary tank 13 through control by the cleaning liquid-pump driving unit 53, and the cleaning liquid is dropped on the lens surface 1a by intermittently driving the air pump 5 through control by the air-pump driving unit 52. More specifically, as illustrated in FIG. 11(a) and FIG. 11(b), the cleaning liquid is stored in the secondary tank 13 by driving the cleaning liquid pump 3 for a period of time from t20 to t21, and then, at a time t22, the air pump 5 is intermittently driven plural times within a period of time T1, whereby the small amount of the cleaning liquid is dropped on the lens surface 1a. For example, by setting the period of time from t22 to t23 to 30 msec, the small amount (for example, 0.25 cc) of the cleaning liquid is dropped on the lens surface 1a for each drop.

As a result, it is possible to always maintain the lens surface 1a in a wet state, and it is possible to prevent deposition of contaminants contained in the water droplet splashed by the vehicle during rainy weather. In other words, the continuous water supply mode is a mode in which the compressed air is caused to intermittently jet from the discharge ports 10a and 10b for plural times, and the cleaning liquid is suctioned with the negative pressure occurring due to the jet of the compressed air to cause the cleaning liquid to jet from the discharge ports 10a and 10b onto the lens surface 1a. This continuous water supply mode is suitable to maintain the lens surface 1a in the wet state at the time of rainy weather to prevent the contaminants from depositing on the lens surface 1a before it happens.

Figure 8:
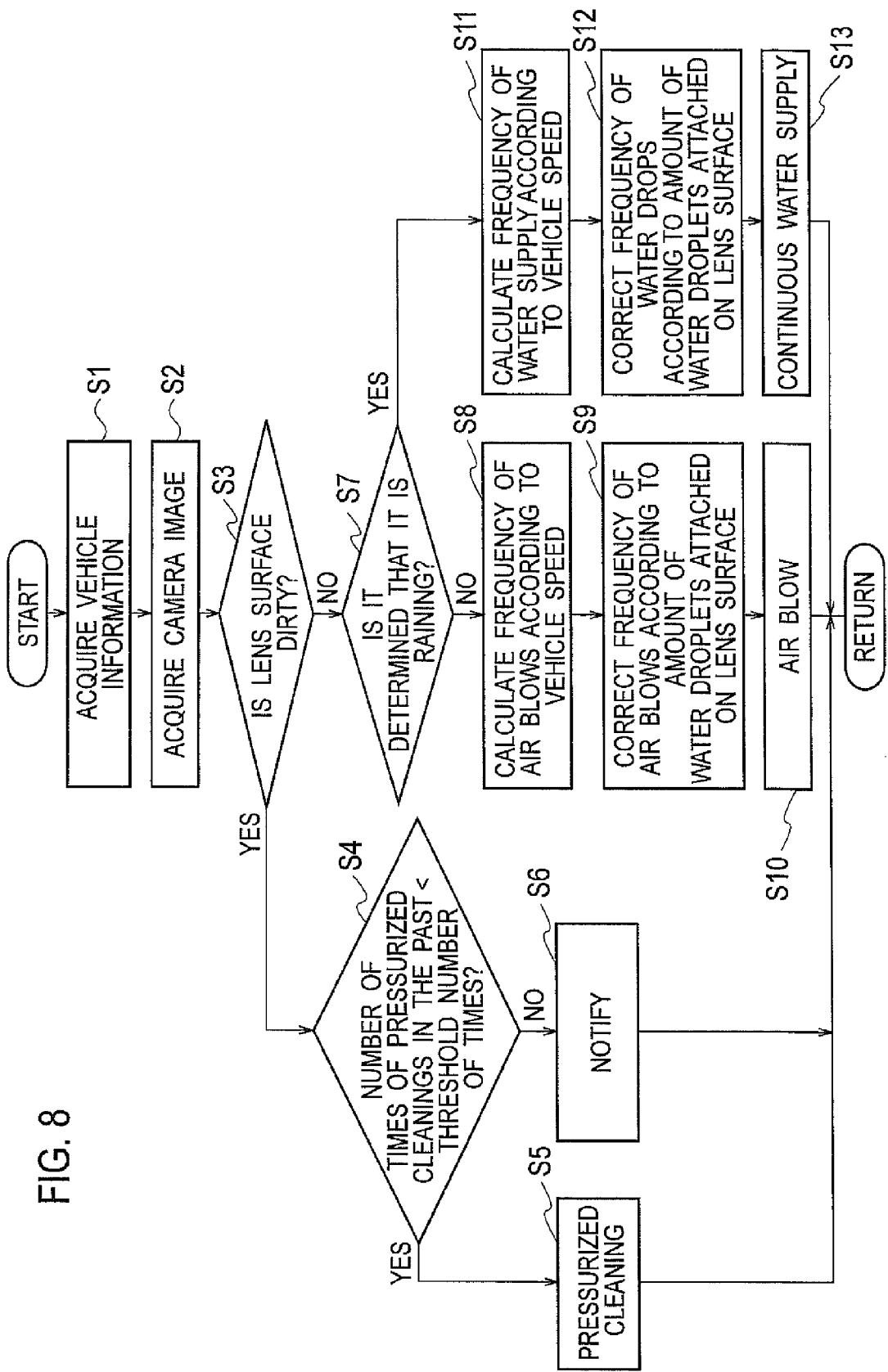
FIG. 8 is a flowchart showing process procedures performed by the cleaning device for a vehicle-mounted camera according to the embodiment of the present invention.

Next, operations of the cleaning device 100 for a vehicle-mounted camera according to this embodiment having the configuration as described above will be described with reference to the flowchart shown in FIG. 8. FIG. 8 shows process procedures performed by the controller 8, which are performed for each predetermined calculation cycle. First, in step S1, the cleaning-operation determiner 51 of the controller 8 acquires various pieces of information on the vehicle to which this cleaning-operation determiner 51 belongs. In other words, it acquires various pieces of vehicle information 30 shown in FIG. 7, more specifically, it acquires the vehicle speed information 31, the wiper switch information 32, the washer switch information 33, the shift position information 34, and the headlight switch information 35.

In step S2, the dirt-state determiner 55 of the controller 8 acquires the camera image information 41.

In step S3, the dirt-state determiner 55 determines based on a camera image whether the lens surface 1a is dirty. The determination as to whether the lens surface 1a is dirty can be made by applying predetermined image processing to a captured image, and determining whether there exists any portion where light is blocked. Furthermore, the determination of the dirt on the lens surface 1a may be made by determining whether it is day or night based on the headlight switch information 35, and changing a condition for determination of the dirt according to whether it is day or night. With the processes as described above, it is possible to make a determination of dirt in a more precise manner. If dirt occurs ("YES" in step S3), the process proceeds to step S4, whereas, if dirt does not occur ("NO" in step S3), the process proceeds to step S7.

If it is determined in the process of step S3 that dirt occurs (YES in step S3), the cleaning-operation determiner 51 determines in step S4 whether the number of times pressurized cleaning in the past is less than a threshold number of times set in advance (for example, three times). Furthermore, if the number of pressurized cleaning in the past is less than the threshold number of times (YES in step S4), the cleaning-operation determiner 51 cleans the lens surface 1a with the pressurized cleaning mode in step S5. More specifically, the air pump 5 is driven by the air-pump driving unit 52, and the cleaning liquid pump 3 is driven by the cleaning liquid-pump driving unit 53, whereby the cleaning liquid and the compressed air are caused to jet from the discharge ports 10a and 10b of the nozzle 7 to clean the dirt attached on the lens surface 1a with the pressurized cleaning mode.

On the other hand, if the number of pressurized cleaning in the past is greater than or equal to the threshold number of times (NO in step S4), it can be determined that the dirt on the lens surface 1a cannot be removed even though cleaning is performed for the threshold number of times with the pressurized cleaning mode, and thus, in step S6, an alarm signal is output by the notification unit 54. With this operation, an alarm is issued by the alarm unit 61, whereby it is possible to make a driver aware that the dirt on the lens surface 1a is not removed.

Furthermore, if it is determined in the process of step S3 that the lens surface 1a is not dirty (NO in step S3), it is determined in step S7 whether it is raining. This process is performed, for example, based on the wiper switch information 32 such that, if a wiper is operated, it is determined that it is raining. Then, if it is determined that it is not raining (NO in step S7), the process proceeds to step S8, whereas, if it is determined that it is raining (YES in step S7), the process proceeds to step S11.

If it is determined in the process of step S7 that it is not raining (NO in step S7), the cleaning-operation determiner 51 obtains, in step S8, the frequency of air blows according to the speed of the vehicle. More specifically, data indicating a relationship between the speed of the vehicle and the frequency of cleanings with the air blow mode are stored in a memory or the like (not illustrated) of the controller 8, and when the vehicle speed information 31 shown in FIG. 7 is acquired by referring to the data, the frequency of cleanings with the air blow mode corresponding to this vehicle speed information is set. For example, the frequency corresponding to the fastest vehicle speed is set to a two-second interval as the greatest frequency; the frequency at the time when the vehicle is stopped is set to a two-minute interval as the smallest frequency; and speeds therebetween are interpolated by straight lines to obtain frequencies. In other words, the frequency of cleanings with the air blow mode is set so as to increase with the increase in the speed of the vehicle.

Furthermore, in step S9, the cleaning-operation determiner 51 detects the amount of water droplets attached on the lens surface 1a, and corrects the frequency of cleanings with the air blow mode according to the amount of water droplets. More specifically, the frequency of cleanings with the air blow mode is corrected by setting a coefficient to "1" in the case where the water droplets attached on the lens surface 1a have a standard size, setting the coefficient to a value greater than or equal to one in the case where the water droplets attached have a size larger than the standard size, and setting the coefficient to a value less than or equal to one in the case where the water droplets attached have a size smaller than the standard size.

Then, in step S10, with the cleaning-operation determiner 51, the lens surface 1a is cleaned with the air blow mode. More specifically, a control instruction is output to the air-pump driving unit 52, whereby the air pump 5 is driven to deliver the compressed air. With this operation, the compressed air passes through the distal end portions 14a and 14b of the air passage 12 to jet from the discharge ports 10a and 10b, whereby it is possible to spray the compressed air over the lens surface 1a to remove the water droplets attached on this lens surface 1a. This cleaning with the air blow mode is repeatedly performed at intervals of time set in accordance with the set frequency.

On the other hand, if it is determined in the process of step S7 that it is raining (YES in step S7), the cleaning-operation determiner 51 obtains, in step S11, the frequency of drops of the cleaning liquid in accordance with the speed of the vehicle. More specifically, data indicating a relationship between the speed of the vehicle and the frequency of cleanings with the continuous water supply mode are stored in a memory (not illustrated) or the like of the controller 8, and when the vehicle speed information 31 shown in FIG. 7 is acquired, the frequency of cleanings with the continuous water supply mode corresponding to this vehicle speed information is set by referring to the data. For example, the frequency corresponding to the fastest speed is set to a 10-second interval as the greatest frequency; the frequency at the time when the vehicle is stopped is set to a 20-second interval as the smallest frequency; and speeds therebetween are interpolated by straight lines to obtain frequencies. In other words, the frequency of cleanings with the continuous water supply mode is set so as to increase with the increase in the speed of the vehicle.

Furthermore, in step S12, the cleaning-operation determiner 51 detects the amount of water droplets attached on the lens surface 1a, and corrects the frequency of cleanings with the continuous water supply mode according to the amount of water droplets. More specifically, the frequency of cleanings with the continuous water supply mode is corrected by setting a coefficient to "1" in the case where the water droplets attached on the lens surface 1a have a standard size, setting the coefficient to a value greater than or equal to one in the case where the water droplets attached have a size larger than the standard size, and setting the coefficient to a value less than or equal to one in the case where the water droplets attached have a size smaller than the standard size.

Then, in step S13, with the cleaning-operation determiner 51, the lens surface 1a is cleaned with the continuous water supply mode. With this operation, it is possible to jet the cleaning liquid from the discharge ports 10a and 10b and drop the cleaning liquid on the lens surface 1a, whereby it is possible to effectively prevent dirt from being attached on this lens surface 1a. This cleaning with the continuous water supply mode is repeatedly performed at intervals of time set in accordance with the set frequency.

As described above, various types of cleaning modes are selected as appropriate according to dirt states of the lens surface 1a, and conditions of the weather as to whether it is raining or not, whereby it is possible to clean the lens surface 1a of the camera 1 with an optimum cleaning mode appropriate for the condition at that time.

It should be noted that, in the processes described above, it may be possible to acquire the current shift position based on the shift position information 34, and operate with each of the cleaning modes only at the time of D range (drive range) and at a predetermined speed (for example, 30 km/h) or faster.

As described above, in the cleaning device 100 for a vehicle-mounted camera according to this embodiment, the air passage 12 is provided to the distal end portion of the nozzle 7; the cleaning liquid paths 11a and 11b are provided in the vicinity of this air passage 12; and the distal end portions 14a and 14b of the air passage 12 and the distal end portions 15a and 15b of the cleaning liquid paths 11a and 11b are merged with each other. Thus, by employing the continuous water supply mode in which the air pump 5 is intermittently driven plural times (for example, four times) to supply the compressed air to the air passage 12 in a state where the cleaning liquid is stored in the secondary tank 13 with drive of the cleaning liquid pump 3, and jetting the compressed air from the distal end portions 14a and 14b, it is possible to make the cleaning liquid paths 11a and 11b into the negative pressure to suction the cleaning liquid from the secondary tank 13, and intermittently jet the cleaning liquid through the merging flow paths 16a and 16b. By reducing the size of particle of the cleaning liquid with wave motion of the air and jetting it, it is possible to efficiently clean the lens surface 1a with the small amount of the cleaning liquid.

Furthermore, it is possible to make the lens surface 1a wet with the cleaning liquid, whereby it is possible to make it difficult for the dirt to be attached on the lens surface 1a. In addition, since the cleaning liquid stored in the secondary tank 13 is intermittently supplied, it is possible to reduce the amount of the cleaning liquid used for cleaning.

Furthermore, by employing the continuous water supply mode when it is raining to jet the cleaning liquid on the lens surface 1a, it is possible to prevent the dirt from being attached on the lens surface 1a, for example, due to splash of mud or rainwater. In addition, with the increase in the speed of the vehicle, the frequency of the continuous water supply increases, and hence, it is possible to appropriately jet the cleaning liquid in accordance with the speed.

Furthermore, by driving the air pump 5 in a state where the cleaning liquid is stopped, it is possible to jet the compressed air with the air blow mode, whereby it is possible to remove the water droplets attached on the lens surface 1a. Then, by selecting the air blow mode when it is raining in a state where no dirt exists on the lens surface 1a, even if rainwater is splashed during travel of the vehicle, and is attached on the lens surface 1a, it is possible to reliably remove the rainwater attached, and clearly capture images with the camera 1. Furthermore, with the increase in the speed of the vehicle, the frequency of cleanings with the air blow mode increases. Thus, it is possible to appropriately remove water droplets in accordance with the speed.

Furthermore, by supplying the compressed air to the air passage 12 to jet it from the distal end portions 14a and 14b, it is possible to perform the pressurized cleaning mode in which the cleaning liquid paths 11a and 11b are made into the negative pressure to suction the cleaning liquid, and the cleaning liquid is caused to merge with the compressed air at the merging flow paths 16a and 16b, and then, is jetted onto the lens surface 1a. Thus, the cleaning liquid can be made into the form of a mist, and it is possible to reduce the amount of cleaning liquid necessary for cleaning. Then, in the case where the lens surface 1a is dirty, cleaning is done with the pressurized cleaning mode, and hence, in the case where the lens surface 1a is dirty, it is possible to immediately clean and remove this dirt.

Furthermore, in the case where dirt cannot be removed even if cleaning with the pressurized cleaning mode is performed for the predetermined number of times, an alarm is issued, and hence, it is possible to make a driver aware that the dirt is attached on the lens surface 1a.

Furthermore, in the cleaning device 100 for a vehicle-mounted camera according to this embodiment, since any one of the pressurized cleaning mode, the air blow mode, and the continuous water supply mode is selected depending on situations to clean the lens surface 1a, it is possible to clean the lens surface 1a with an appropriate mode according to the driving situations.

These are descriptions of the cleaning device for a vehicle-mounted camera according to the present invention based on the embodiment illustrated. However, the present invention is not limited to those described above, and it may be possible to replace the configuration of each unit with any given configuration that has a similar function.

For example, in the embodiment described above, descriptions have been made of an example in which one line of air passage 12 and two lines of cleaning liquid paths are provided in the nozzle 7, and these are merged to form two lines of merging flow paths 16a and 16b. However, the present invention is not limited to this, and it may be possible to employ a configuration in which one or more air passages and one or more cleaning liquid paths are merged at the distal end portion.

Furthermore, the embodiment described above employs the configuration in which the compressed air and the cleaning liquid are merged at the distal end portion of the nozzle 7. However, the present invention is not limited to this, and it is possible to employ a configuration in which the air passage and the cleaning liquid paths are disposed so as to be close to each other, and when the compressed air is discharged from the air passage, the cleaning liquid supplied from the cleaning liquid path is made into the form of a mist using the negative pressure at this time, thereby jetting it. In this case, the distal end portions 14a and 15a and the distal end portions 14b and 15b, each of which is illustrated in FIG. 4(b), are not merged, and jetting is performed in a state where they are proximate to each other.

The present invention can be used to effectively clean the lens surface of the camera mounted on the vehicle with a small amount of cleaning liquid.

The invention claimed is:

1. A cleaning device for a vehicle-mounted camera, which cleans a lens surface of a camera mounted on a vehicle, the cleaning device comprising:
   a nozzle having a discharge port;
   a cleaning-liquid pump configured to deliver a cleaning liquid from a primary tank to a smaller secondary tank configured to store the cleaning liquid delivered by the cleaning-liquid pump and to deliver the cleaning liquid through a cleaning liquid path to the discharge port of the nozzle;
   an air pump configured to deliver compressed air through an air passage to the discharge port of the nozzle,
      wherein the cleaning liquid and the compressed air are discharged from the discharge port, which is disposed so as to face the lens surface, and
      wherein a distal end portion of the cleaning liquid path and a distal end portion of the air passage are disposed so as to be proximate to each other or merged with each other; and
   a control unit configured to:
      control the cleaning-liquid pump and the air pump, wherein the control unit is configured to include a continuous water supply mode in which the control unit drives the cleaning-liquid pump for a fixed period of time and thereafter intermittently drives the air pump a plurality of times such that the cleaning liquid delivered to and stored in the secondary tank is suctioned along the cleaning liquid path by the compressed air; and
      when in the continuous water supply mode, set a frequency of drops of the cleaning liquid based on a speed of the vehicle.

2. The cleaning device for a vehicle-mounted camera according to claim 1, wherein in addition to the continuous water supply mode, the control unit is configured to include an air blow mode in which the control unit stops delivery of the cleaning liquid by the cleaning-liquid pump, and drives the air pump to make only the compressed air jet from the discharge port.

3. The cleaning device for a vehicle-mounted camera according to claim 2, wherein in addition to the continuous water supply mode and the air blow mode, the control unit is configured to include a pressurized cleaning mode in which the control unit drives the cleaning-liquid pump and the air pump at the same time to make the cleaning liquid and the compressed air continuously jet from the discharge port.

4. The cleaning device for a vehicle-mounted camera according to claim 3, wherein the control unit is configured to determine a dirt state of the lens surface and wherein the control unit controls the cleaning-liquid pump and the air pump using the pressurized cleaning mode if the dirt-state indicates that dirt is present on the lens surface.

5. The cleaning device for a vehicle-mounted camera according to claim 3, wherein the control unit is configured to determine a dirt state of the lens surface,
   wherein the control unit is configured to determine, based on vehicle information, whether it is raining, and
   wherein the control unit controls the cleaning-liquid pump and the air pump using the continuous water supply mode if the dirt-state indicates that the lens surface is not dirty and the control unit determines that it is raining.

6. The cleaning device for a vehicle-mounted camera according to claim 3, wherein the control unit is configured to determine a dirt state of the lens surface,
   wherein the control unit is configured to determine, based on vehicle information, whether it is raining, and
   wherein the control unit controls the cleaning-liquid pump and the air pump using the air blow mode if the dirt-state indicates that the lens surface is not dirty and the control unit determines that it is not raining.

7. A method of cleaning a lens surface of a vehicle-mounted camera using a cleaning device, the cleaning device comprising:
   a nozzle having a discharge port;
   a cleaning-liquid pump configured to deliver a cleaning liquid from a primary tank to a smaller secondary tank configured to store the cleaning liquid delivered by the cleaning-liquid pump and to deliver the cleaning liquid through a cleaning liquid path to the discharge port of the nozzle;
   an air pump configured to deliver compressed air through an air passage to the discharge port of the nozzle, wherein the cleaning liquid and the compressed air are discharged from the discharge port; and
   a control unit configured to control the cleaning-liquid pump and the air pump, the method comprising:
      in accordance with a continuous water supply mode, driving the cleaning-liquid pump for a fixed period of time to deliver cleaning liquid to the secondary tank;
      after driving the cleaning-liquid pump for the fixed period of time, intermittently driving the air pump a plurality of times such that the cleaning liquid delivered to and stored in the secondary tank is suctioned along the cleaning liquid path by the compressed air and delivered to the nozzle; and
      set a frequency of drops of the cleaning liquid based on a speed of the vehicle, wherein both the cleaning liquid and the compressed air jet from the discharge port to be dropped on the lens surface.

* * * * *